US008782797B2

(12) United States Patent
Wang et al.

(10) Patent No.: US 8,782,797 B2
(45) Date of Patent: Jul. 15, 2014

(54) LOCKBOX FOR MITIGATING SAME ORIGIN POLICY FAILURES

(75) Inventors: Jiahe Helen Wang, Issaquah, WA (US); Xiaofeng Fan, Redmond, WA (US); Shuo Chen, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1217 days.

(21) Appl. No.: 12/175,264

(22) Filed: Jul. 17, 2008

(65) Prior Publication Data

US 2010/0017883 A1  Jan. 21, 2010

(51) Int. Cl.
G06F 7/04 (2006.01)
(52) U.S. Cl.
USPC .................. 726/26; 726/4; 726/7; 726/30
(58) Field of Classification Search
USPC .............................. 726/4, 7, 26, 30
See application file for complete search history.

(56) References Cited

U.S. PATENT DOCUMENTS

| | | | | |
|---|---|---|---|---|
| 4,203,166 A | * | 5/1980 | Ehrsam et al. ............ | 380/45 |
| 4,227,253 A | * | 10/1980 | Ehrsam et al. ............ | 380/45 |
| 5,210,874 A | * | 5/1993 | Karger ..................... | 719/328 |
| 6,460,079 B1 | * | 10/2002 | Blumenau ................. | 709/223 |
| 6,523,063 B1 | * | 2/2003 | Miller et al. .............. | 709/206 |
| 6,839,721 B2 | * | 1/2005 | Schwols .................. | 1/1 |
| 6,934,757 B1 | * | 8/2005 | Kalantar et al. ........... | 709/229 |
| 7,051,084 B1 | * | 5/2006 | Hayton et al. ............ | 709/219 |
| 7,328,435 B2 | * | 2/2008 | Trifon .................... | 717/171 |
| 7,506,248 B2 | * | 3/2009 | Xu et al. ................. | 715/240 |
| 7,788,726 B2 | * | 8/2010 | Teixeira ................. | 726/26 |
| 7,831,570 B2 | * | 11/2010 | Sack et al. ............... | 707/694 |
| 8,613,070 B1 | * | 12/2013 | Borzycki et al. ........... | 726/8 |
| 2002/0133720 A1 | * | 9/2002 | Sherman et al. ........... | 713/201 |
| 2002/0138624 A1 | * | 9/2002 | Esenther .................. | 709/227 |
| 2003/0002526 A1 | * | 1/2003 | Dias et al. ............... | 370/466 |
| 2003/0135504 A1 | * | 7/2003 | Elvanoglu et al. ......... | 707/100 |
| 2003/0145071 A1 | * | 7/2003 | Straut et al. .............. | 709/223 |
| 2003/0163567 A1 | * | 8/2003 | McMorris et al. .......... | 709/225 |
| 2004/0210536 A1 | * | 10/2004 | Gudelj et al. ............. | 705/64 |
| 2005/0055458 A1 | * | 3/2005 | Mohan et al. ............. | 709/238 |
| 2005/0204041 A1 | * | 9/2005 | Blinn et al. .............. | 709/225 |
| 2005/0223412 A1 | * | 10/2005 | Nadalin et al. ........... | 726/3 |
| 2005/0259655 A1 | * | 11/2005 | Cuervo et al. ............ | 370/392 |
| 2006/0053224 A1 | * | 3/2006 | Subramaniam ........... | 709/227 |
| 2006/0195609 A1 | * | 8/2006 | Han ..................... | 709/245 |
| 2006/0195816 A1 | * | 8/2006 | Grandcolas et al. ....... | 717/101 |

(Continued)

OTHER PUBLICATIONS

The Elements of Style, 3rd Edition, Macmillan Publishing Co., Inc., New York, N.Y., 1979, p. 40.*

(Continued)

*Primary Examiner* — Calvin Cheung
(74) *Attorney, Agent, or Firm* — Dan Choi; Carole Boelitz; Micky Minhas

(57) ABSTRACT

Systems and methods to manage same-origin-policy (SOP) failures that occur in a computing environment are provided. In an illustrative implementation, an exemplary computing environment comprises a lockbox module, and an instruction set comprising at least one instruction directing the lockbox module to process data and/or computing application execution commands representative of and a request for a selected operation/feature according to a selected SOP management paradigm. In the illustrative implementation, the SOP management paradigm comprises one or more instructions to deploy a "lockbox" computing application element allowing for the management, monitoring, and control of computing application features/operations operable under a same origin policy.

20 Claims, 8 Drawing Sheets

(56) References Cited

U.S. PATENT DOCUMENTS

| | | | |
|---|---|---|---|
| 2006/0253446 A1* | 11/2006 | Leong et al. | 707/9 |
| 2007/0107057 A1* | 5/2007 | Chander et al. | 726/22 |
| 2007/0136603 A1* | 6/2007 | Kuecuekyan | 713/185 |
| 2007/0240208 A1* | 10/2007 | Yu et al. | 726/13 |
| 2007/0244897 A1* | 10/2007 | Voskuil et al. | 707/9 |
| 2007/0300064 A1* | 12/2007 | Isaacs et al. | 713/168 |
| 2008/0263650 A1* | 10/2008 | Kerschbaum | 726/9 |
| 2008/0298342 A1* | 12/2008 | Appleton et al. | 370/351 |
| 2014/0053234 A1* | 2/2014 | Barton et al. | 726/1 |

OTHER PUBLICATIONS

Erik Hatcher, "Remote Scripting Using a Servlet", Feb. 1, 2001, pp. 1-7, http://www.ibm.com/developerworks/web/library/waresc/.*
Kings-Lynne, Christopher, "Implementing Cross-Domain Cookies", Nov. 28, 2000, www.phpbuilder.com/columns/chriskings20001128.php3?print_mode=1.*
Chen, et al., "An Analysis of Browser Domain-Isolation Bugs and a Light-Weight Transparent Defense Mechanism," In Proceedings of the ACM Conference on Computer and Communications Security, Alexandria, VA, Oct.-Nov. 2007, 10 pages.
Adobe Flash Player Statistics: Flash content reaches over 98% of Internet viewers. Adobe Systems, Incorporated, 2007 [retrieved from the May 3, 2007 Internet Archive capture: <https://web.archive.org/web/20070503130602/http://www.adobe.com/products/player_census/flashplayer/>].
Cross Site Scripting in Flash. Adobe Systems, Incorporated, Nov. 30, 2004 [retrieved from the May 11, 2008. Internet Archive capture: <https://web.archive.org/web/20080511015524/http://kb.adobe.com/selfservice/viewContent.do?externalId=tn_19604&sliceId=1>, Last Updated Nov. 30, 2004].
Flash 8 Documentation. addCallback (ExternalInterface.addCallback method), Learning ActionScript 2.0 in Adobe. Flash, Adobe Systems, Incorporated, 2007 [Online Retrieved from <http://help.adobe.com/en_US//AS2LCR/Flash_10.0/help.html?content=00001037.html>].
Macromedia Flash—Scripting with Flash 5: Methods. Adobe Systems, Incorporated, 2007 [retrieved from the Mar. 26, 2007 Internet Archive capture: <https://web.archive.org/web/20070326210206/http://www.adobe.com/support/flash/publishexport/scriptingwithflash/scriptingwithflash_03.html>].
How Bank of America SiteKey Works for Online Banking Security, Bank of America, N.A, 2006 [Retrieved from the Apr. 27, 2007 Internet Archive Capture: >https://web.archive.org/web/20070427180135/http://www.bankofamerica.com/privacy/sitekey>].
Browser Statistics.w3schools.com [Retrieved from the May 3, 2007 Internet Archive capture: <https://web.archive.org/web/20070203012045/http://www.w3schools.com/browsers/browsers_stats.asp>].
Symantec Connect, "Apache Error Message Cross-Site Scripting Vulnerability," [retrieved from the Jan. 29, 2004 Internet Archive capture: <https://web.archive.org/web/20040129205746/http://www.securityfocus.com/bid/4437/discussion/>].
Opera Cross-Frame Vulnerabilities, Security Focus Vulnerability Database, Bug ID 8887, retrieved at <http://www.securityfocus.com/bid/8887>, Published on Oct. 24, 2003, 1 page.
Christey, Steven M., "Vulnerability Type Distribution in CVE," retrieved at <http://www.attrition.org/pipermaill.vim/2006-September/001032.html>, Sep. 14, 2006, 8 pages.
Dhamija, et al., "The Battle Against Phishing: Dynamic Security Skins," In Proceedings of the Symposium on Usable Privacy and Security (SOUPS), Jul. 6-8, 2005, 12 pages.
Dhamija, et al., "Deja Vu: A User Study. Using Images for Authentication," In Proceedings of the 9th USENIX Security Symposium, Aug. 14-17, 2000, 15 pages.
Elson, et al., "Asirra: A CAPTCHA that Exploits Interest-Aligned Manual Image Categorization," In Proceedings of the CCS'07, Alexandria, VA, Oct. 29-Nov. 2, 2007, 9 pages.

Freed, et al., "Media Type Specifications and Registration Procedures," retrieved at <http://www.ietf.org/rfc/rfc4288.txt>, Dec. 2005, 17 pages.
Jackson, et al., "Protecting Browsers from DNS Rebinding Attacks," In Proceedings of the Fourteenth ACM Conference on Computer and Communications Security (CCS 2007), Nov. 2007, 11 pages.
Jim, et al., "Defeating Script Injection Attacks with Browser Enforced Embedded Policies," In Proceedings of the 16th International World Wide Web Conference (WWW2007), Banff, Alberta, Canada, May 8-12, 2007, 10 pages.
Benjamin Livshits and Monica S. Lam. "Finding Security Vulnerabilities in Java Applications with Static Analysis," In Proceedings of the 14th Usenix Security Symposium, Baltimore, Maryland, Aug. 2005, 16 pages.
Gottwald, Dao, "LocationBar2," Last Updated Jun. 23, 2008 [Online, Retrieved from the Jun. 30, 2009 Internet Archive capture: <https://web.archive.org/web/20090630142734/https://addons.mozilla.org/en-US/firefox/addon/4014>, Last Updated Jun. 23, 2008].
Ludwig, Adrian, "Macromedia Flash Player 8 Security," Retrieved at http://cfile3.uf.tistory.com/attach/2020F5184BC4B2B703201B, Sep. 2005, 51 pages.
About Asynchronous Pluggable Protocols. Microsoft Developer Network [Retrieved from the Apr. 23, 2007 Internet Archive capture: <https://web.archive.org/web/20070423131351/http://msdn2.microsoft.com/en-us/library/aa767916.aspx>].
Mozilla Developer Center. DOM:document.referrer, Retrieved from the Sep. 7, 2008 Internet Archive capture at <https://web.archive.org/web/20080907222612/http://developer.mozilla.org/en/DOM/document.referrer>, Last Updated Sep. 22, 2006].
MIME Type Detection in Windows Internet Explorer. MSDN Library [retrieved from the Apr. 23, 2007 Internet Archive capture: <https://web.archive.org/web/20070423131351/http://msdn2.microsoft.com/en-us/library/ms775147.aspx>].
Referrer Property, MSDN Library [retrieved from the Apr. 9, 2008 Internet Archive capture: <https://web.archive.org/web/20080409212404/http://msdn2.microsoft.com/en-us/library/ms534365(VS.85).aspx>].
Walkthrough: Calling Managed Code from Client Script. MSDN Library [Retrieved from the Apr. 12, 2008 Internet Archive capture: <https://web.archive.org/web/20080412065514/http://msdn2.microsoft.com/en-us/library/cc221414(vs.95).aspx>].
Reis, et al., "Detecting In-Flight Page Changes with Web Tripwires," In Proceedings of the Networked Systems Design and Implementation (NSDI): 5th USENIX Symposium, Apr. 16-18, 2008, 14 pages.
Ronda, et al., " iTrustPage: A User-Assisted Anti-Phishing Tool," In Proceedings of the ACM European Conference on Computer Systems (EuroSys), Glasgow, Scotland, Apr. 1-4, 2008, 12 pages.
Ruderman, Jesse. The Same Origin Policy. [Online, Last Modified Aug. 24, 2001, Retrieved from the Apr. 30, 2007 Internet Archive capture: <https://web.archive.org/web/20070430034837/http://www.mozilla.org./projects/security/components/same-origin.html>].
Schechter, et al., "The Emperors New Security Indicators: An evaluation of website authentication and the effect of role playing on usability studies," In Proceedings of the 2007 IEEE Symposium on Security and Privacy, Oakland, CA. May 20-23, 2007, 15 pages.
SpoofStick, Dec. 8, 2005, [Retrieved from the Apr. 27, 2007 Internet Archive capture: <https://web.archive.org/web/20070427175514/http://www.spoofstick.com/>].
Wang, et al., "Protection and Communication Abstractions for Web Browsers in MashupOS," In Proceedings of the 21st ACM Symposium on Operating Systems Principles (SOSP), Stevenson, WA, Oct. 14-17, 2007, 15 pages.
Xu, et al., "Taint-Enhanced Policy Enforcement: A Practical Approach to Defeat a Wide Range of Attacks," In Proceedings of the 15th USENIX Security Symposium, Vancouver, BC, Canada, Jul. 2006, 18 pages.
Ye, et al., "Trusted Paths for Browsers," In Proceedings of the 11th Usenix Security Symposium, Aug. 5-9, 2002, 18 pages.
Yee, et al., "Passpet: Convenient Password Management and Phishing Protection," In Proceedings of the Symposium on Usable Privacy and Security, Pittsburgh, PA, Jul. 12-14, 2006, 12 pages.

(56) References Cited

OTHER PUBLICATIONS

W3C Architecture domain, Document Object Model (DOM), Jan. 19, 2005 [Online, Retrieved at <http://www.w3.org/DOM/>], 3 pages.
W3C Working Draft, "The XMLHttpRequest Object," [Online, Retrieved at <http://www.w3.org/TR/2006/WD-XMLHttpRequest-20060619/>], Jun. 19, 2006, 13 pages.
Wikipedia, Adobe Flash, [Online, Retrieved from the Feb. 27, 2007 Internet Archive capture: <https://web.archive.org/web/20070227110150/http://en.wikipedia.org/wiki/Adobe_Flash>].
Wikipedia, Antivirus Software, [Online, Retrieved from the Jan. 11, 2007 Internet Archive capture: <https://web.archive.org/web/20070111195333/http://en.wikipedia.org/wiki/Antivirus>].
Wikipedia, CAPTCHA, [Online, Retrieved from the Apr. 26, 2007 Internet Archive capture: <https://web.archive.org/web/20070426040800/http://en.wikipedia.org/wiki/Captcha>].
Wikipedia, Cross-site scripting, [Online, Retrieved from the Feb. 6, 2007 Internet Archive capture: <https://web.archive.org/web/20070206063912/http://en.wikipedia.org/wiki/Cross-site_scripting>].
Wikipedia, Intrusion detection system, [Online, Retrieved from the Oct. 5, 2006 Internet Archive capture: <https://web.archive.org/web/20061005123415/http://en.wikipedia.org/wiki/Intrusion-detection_system>].
Wikipedia, Samy (XSS), Last Modified Oct. 9, 2007, [Online, Retrieved from the Nov. 9, 2007 Internet Archive capture: <https://web.archive.org/web/20071109065918/http://en.wikipedia.org/wiki/Samy_(XSS)>].
Mozilla Cross-Doman Frame Loading Vulnerability, Firefox Cross-Frame Vulnerabilities, Security Focus Vulnerability Database, Bug ID 10877, [Online, Retrieved From the May 27, 2007 Internet Archive Capture: <https://web.archive.org/web/20070527182032/http://www.securityfocus.com/bid/10877>], Published on Jul. 1, 2004, 12 pages.
Mozilla/Firefox Browswers URI Drag and Drop Cross-Domain Scripting Vulnerability, Firefox Cross-Frame Vulnerabilities, Security Focus Vulnerability Database, Bug ID 11177, [Online, Retrieved From the May 27, 2007 Internet Archive Capture: <https://web.archive.org/web/20070527182032/http://www.securityfocus.com/bid/11177>], Published on Sep. 14, 2004, 3 pages.
Mozilla Mozilla/Firefox Cross-Domain Tab Window Script Execution Vulnerability, Firefox Cross-Frame Vulnerabilities, Security Focus Vulnerability Database, Bug ID 12465, [Online, Retrieved From the Jun. 3, 2005 Internet Archive Capture: <https://web.archive.org/web/20050603073745/http://www.securityfocus.com/bid/12465>], Published on Feb. 7, 2005, 2 pages.

Mozilla Firefox Sidebar Panel Script Injection Vulnerability, Firefox Cross-Frame Vulnerabilities, Security Focus. Vulnerability Database, Bug ID 12884 [Online, Retrieved From the May 27, 2007lnternet Archive Capture: <https://web.archive.org/web/20070527182032/http://www.securityfocus.com/bid/12884>], Published on Mar. 23, 2005, 2 pages.
Mozilla Firefox Search Target Sidebar Panel Script Code Execution Vulnerability, Firefox Cross-Frame Vulnerabilities, Security Focus Vulnerability Database, Bug ID 13231 [Online, Retrieved at <http://www.securityfocus.com/bid/13231>], Published on Apr. 16, 2005, Updated on Feb. 22, 2007, 4 pages.
Mozilla Firefox/Thunderbird/Seamonkey Multiple Remote Vulnerabilities, Firefox Cross-Frame Vulnerabilities, Security Focus Vulnerability Database, Bug ID 20042 [Online, Retrieved From the Oct. 16, 2006 Internet Archive Capture: <https://web.archive.org/web/20061016185509/http://www.securityfocus.com/bid/20042>], Published on Sep. 15, 2006, Updated on Oct. 16, 2006, 4 pages.
Opera Same Origin Policy Circumvention Vulnerability, Opera Cross-Frame Vulnerabilities, Security Focus Vulnerability Database, Bug ID 3553, [Online, Retrieved at <http://www.securityfocus.com/bid/3553>, Published on Nov. 15, 2001, 2 pages.
Opera Frame Location Same Origin Policy Circumvention Vulnerability, Opera Cross-Frame Vulnerabilities, Security Focus Vulnerability Database, Bug D 4745, [Online, Retrieved From the Internet Archive Capture: <https://web.archive.org/web/20061020180314/http://www.securityfocus.com/bid/4745>], Published on May 15, 2002, 3 pages.
Opera Cross Domain Scripting Vulnerability, Opera Cross-Frame Vulnerabilities, Security Focus Vulnerability Database, Bug ID 6754, [Online, Retrieved at <http://www.securityfocus.com/bid/6754>], Published on Feb. 4, 2003, 1 page.
Mozilla Firefox Search Target Sidebar Panel Script Code Execution Vulnerability, Netscape Navigator Cross-Frame Vulnerabilities. Security Focus Vulnerability Database. Bug ID 13231, [Online, Retrieved at <http://www.securityfocus.com/bid/13231>, Published on Apr. 16, 2005, Updated on Feb. 22, 2007, 4 pages.
Opera Web Browser IFRAME Zone Restriction Bypass Vulnerability, Opera Cross-Frame Vulnerabilities, Security Focus Vulnerability Database, Bug ID 8887, [Online, Retrieved From the May 27, 2007 Internet Archive Capture: <https://web.archive.org/web/20070527181330/http://www.securityfocus.com/bid/8887>], Published on Oct. 24, 2003, 1 page.
Mozilla/Firefox Browsers Uri Drag and Drop Cross-Domain Scripting Vulnerability, Netscape Navigator Cross-Frame Vulnerabilities. Security Focus Vulnerability Database. Bug ID 11177, [Online, Retrieved From the Internet Archive Capture: <https://web.archive.org/web/20070527182032/http://www.securityfocus.com/bid/11177>], Published on Sep. 14, 2004, 3 pages.

* cited by examiner

LOCKBOX FOR MITIGATING SAME ORIGIN POLICY FAILURES

BACKGROUND

The protection model of the World Wide Web and cooperating web browsers is generally governed by the Same-Origin Policy (SOP). Typically, SOP provides a domain or site-based isolation on the browser side, preventing code of one domain from accessing any resources belonging to another domain.

Unfortunately, SOP has been constantly violated. Such violations could be due to Cross Site Scripting (XSS) vulnerabilities in Web services, which enable maliciously injected scripts to unrightfully run with the privilege of the domain of the Web service. The violations could also be exploiting cross-domain browser vulnerabilities that are often due to the complex browser logic such as navigation, scripting, user event handling, etc. The compromise of SOP can be detrimental and can result in damages, such as information theft, Web server intrusions, and vandalism.

Other current practices such as secure sockets layer (SSL) are not excepted from the vulnerabilities of SOP. Despite the end-to-end authentication and encryption in an SSL session, a SOP compromise can cause an unauthenticated, malicious script to run in the name of the hypertext transfer protocol secured (HTTPS) domain. With current practices, SOP violations can be widespread contributing significantly to security vulnerabilities. Cross-domain vulnerabilities are sometime called "universal XSS" bugs. In this context, when a browser contains these types of bugs, webpages from other websites are also vulnerable to SOP attack, as if the websites contained XSS bugs. Cross-domain bugs are not browser agnostic and affect various commercially available web browsers including but not limited to Internet Explorer (IE), Firefox, Opera and Netscape Navigator.

Generally, it is difficult to anticipate all possible SOP vulnerabilities in today's Web services. Stated differently, the combined complexity of client mashups, server software and the browser can be unmanageable. Given the nature of SOP attacks, as long as an SOP vulnerability exists in any point of this complex system, a malicious script can subvert the entire victim domain. Generally, current practices do not provide effective, efficient, and repeatable mechanisms/operations to allow for the management of domain operations to mitigate and/or eliminate the effects of an SOP attack.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to manage same-origin-policy (SOP) failures that occur in a computing environment. In an illustrative implementation, an exemplary computing environment comprises a lockbox module, and an instruction set comprising at least one instruction directing the lockbox module to process data and/or computing application execution commands representative of and a request for a selected operation/feature according to a selected SOP management paradigm. In the illustrative implementation, the SOP management paradigm comprises one or more instructions to deploy a "lockbox" computing application element ("lockbox") allowing for the management, monitoring, and control of computing application features/operations operable under a same origin policy.

In an illustrative operation, a request for data and/or the execution of an application feature/operation is received by the lockbox module. Responsive to the data/operations request the lockbox module determines if the request originated from its own HTML DOM tree. In the illustrative operation, if the request originates from its own HTML DOM tree, the request is fulfilled. In the event that the request does not originate from its own HTML DOM tree, the request is denied and the data and/or application feature is not provided and/or executed (i.e., the content in the lockbox is not provided to the requesting source). In the illustrative operation, the lockbox can look to the policy association of the data and/or application feature being requested to determine if the requested data and/or application feature is subject to one or more policy restrictions, such as those provided by the use of a lockbox.

In the illustrative operation, the lockboxed content can comprise one or more properties comprising that the lockbox maintains its own source designation tree (e.g., HTML DOM tree), that nothing can access the lockboxed content other than the designated sources (e.g., its own DOM tree), and that the lockboxed content must run as the principal of is domain. In the illustrative implementation, a lockbox computing application element comprises one or more parameters which illustratively describes which sources that can successfully request the data and/or application feature.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
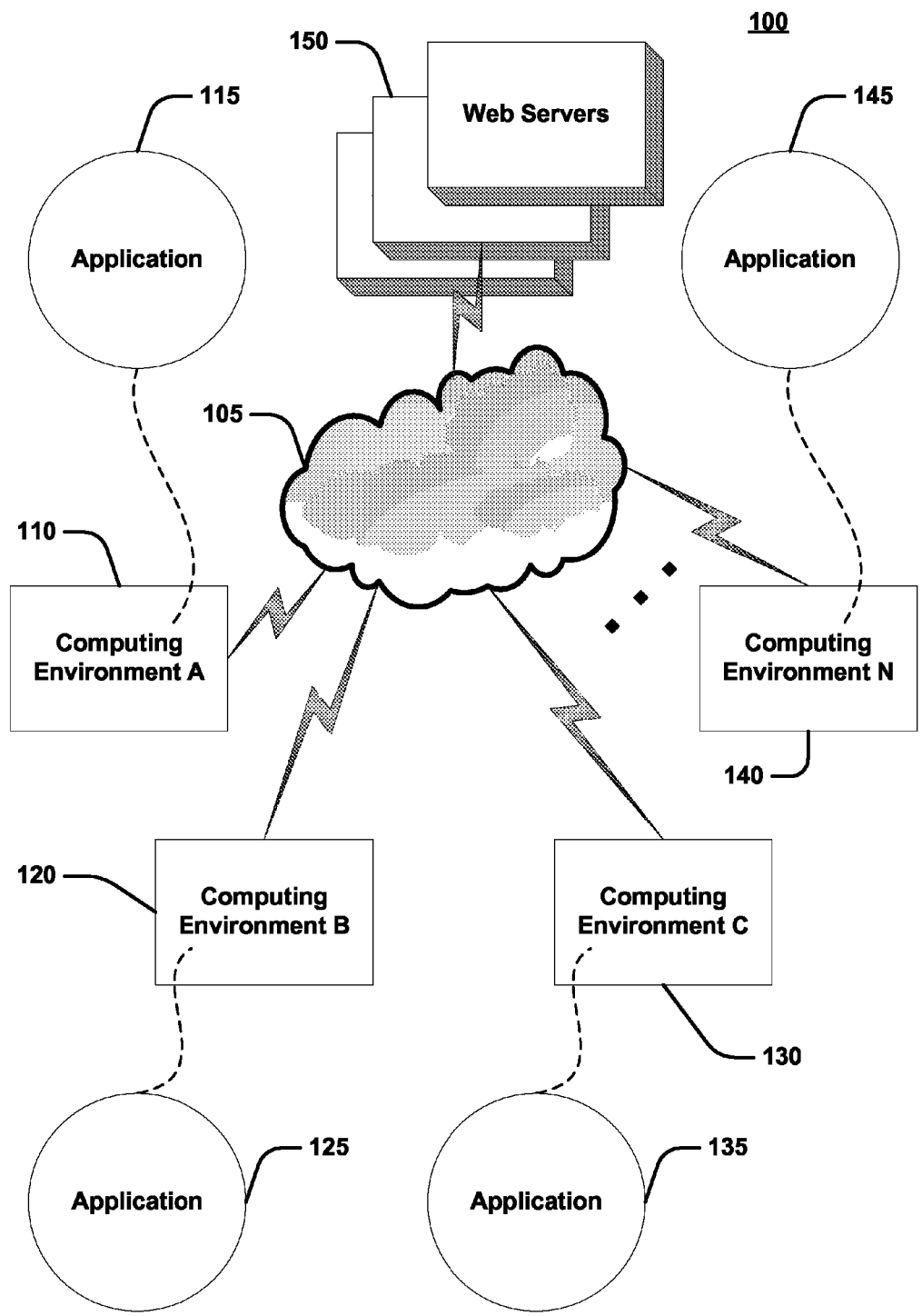
FIG. 1 is a block diagram of one example of a distributed computing environment in accordance with the herein described systems and methods.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Same-Origin-Policy Overview:

Generally, same-origin-policy (SOP) governs the access control on today's web browsers. Illustratively, SOP prevents documents or scripts loaded from one origin from getting or setting properties of documents from a different origin. (i.e., the origin that a script is loaded is the origin of the document that contains the script rather than the origin that hosts the script). Generally, two pages have the same origin if the protocol, port (if given), and host are the same for both pages. Each browser window, frame, or i-frame is a separate document, and each document is associated with an origin. SOP policy generally relates to various browser resources including, cookies or other local persistent storage, the HTML DOM tree, and remote data access.

In more detail, a website can only set its own cookie and a cookie is sent to the website that sets the cookie along with HTTP requests to that website. Operatively, two documents from different origins cannot access each other's HTML document using the Document Object Model (DOM). The DOM is a platform and language-neutral interface that allows computer programs and scripts to dynamically access and update content, structure and style of documents. A script can access its document origin's remote data store using the XMLHttpRequest object, which operatively issues an asynchronous HTTP request to the remote server.

Unfortunately, SOP is constantly violated by attacks exploiting either Cross Site Scripting (XSS) vulnerabilities in Web applications or browser cross-domain vulnerabilities. In XSS, an attacker often exploits the case where a Web application injects user input into a dynamically generated page, without first filtering the input. The injected content may be either persistent or non-persistent. As an example of a persistent injection, an attacker can upload a maliciously-crafted profile to a social networking website. The website can then inject the content into pages shown to others who view the profile. An injected script can run with the social networking website as its domain, enabling the script to make requests back to the website on behalf of the user. For example, the notorious Samy worm that plagued the website MYSPACE.COM exploited persistent injection; it infected over one million MYSPACE.COM user profiles within the first twenty hours of its release. A malicious input may also be non-persistent, simply reflected through a Web server. A malicious input may also be non-persistent, simply reflected through a web server. For example, suppose a search site replies to a query x with a page that says "No results found for x". An attacker can trick a user into visiting a URL which contains a malicious script within the query x to the search site. The script in the reflected page from the search site can then run with the search site's privilege.

Existing countermeasures include using static program analysis to locate user input, dynamic data flow analysis for detecting attacks at the run-time, filtering, white-listing or disallowing scripts in user input (sacrificing functionality for security), or sandboxing user input and deprive its privileges of accessing any domain's resources. These are important first-line defenses which can eliminate many XSS vulnerabilities or attacks. Nevertheless, these techniques are not foolproof and require Web developers' efforts to identify potentially insecure contents, to run static analysis tools, or to specify application-specific policies. This necessitates a second-line defense.

Current web browser products have had cross-domain vulnerabilities that exist in SOP enforcement mechanisms of browsers. Operatively, they can enable a script in http://a.com domain to access a document in http://b.com domain as if they were from the same domain. The bugs are mainly due to the complexity of SOP enforcement when combined navigations, multiple window interactions, object aliasing and caching, and such are executed in the web browser. Sometimes this type of bug is referred to as "universal XSS" because for the user population of a vulnerable browser, SOP is completely lost, as if every web site had XSS vulnerabilities. A defense for such vulnerabilities is software patches which are typically released on a monthly schedule.

Lockbox Overview:

The herein described systems and methods aim to ameliorate the shortcomings of existing practices by providing a computing application element that when deployed enforces SOP policies to mitigate SOP failures. Generally, SOP offers a coarse-grained, all-or-nothing access control model. That is, all content inside a document are treated equal and can access all of the document-domain's resources, such as the domain's HTML DOM objects, cookies, and remote data access through XMLHttpRequest. In the context of web browsers and the world wide web, a domain corresponds to an OS principal. For purposes of the description provided herein "domain" and "principal" can be used interchangeably.

SOP's equal treatment is undesirable when a domain hosts untrustworthy third-party content (e.g., user profiles hosted at a social networking web site) or when a domain contains sensitive content that deserves to be guarded with a higher level of security. For the untrustworthy content, the current practice of MashupOS <Sandbox> can be used to render such content and the sandboxed content is deprived privileges to access any principal or domain's resources. For sensitive content, one possible solution is to use a separate domain for such content. However, attacks exploiting SOP failures would make sensitive content accessible and tamperable. To mitigate SOP failures and to protect sensitive content, the herein described systems and methods provide a lockbox abstraction (e.g., an HTML element), for giving escalated privilege and providing stronger protection for sensitive content.

In an illustrative implementation, lockbox can be deployed according to the following syntax:

```
<Lockbox src='aFileName'>
    Fallback if tag not supported
</Lockbox>
```

The lockboxed content can maintain the following properties including but not limited to: (1) the lockbox has its own HTML DOM tree; (2) other sources are prevented from accessing the lockboxed content other than its own DOM tree; and (3) The lockboxed content runs as the principal of its domain.

It follows from the second described property that content from the same domain outside the lockbox cannot access the content inside the lockbox; i.e., lockboxes (even when nested) cannot access one another. When a lockbox nests a same-domain iframe, the iframe cannot access the lockbox's content because the iframe has its own separate document DOM tree. This access model is can be enforced in web browsers because the exemplary model provides document isolation rather than domain isolation as in SOP. Domain isolation involves cross document access control, which is error-prone when combined with navigation, object caching and aliasing, event handling, and such. Many browser cross-domain bugs occur as a result of unexpected domain-changes when dealing with such complex logic.

As described herein, the third lockbox property provides that a lockbox adheres to SOP and can access all resources of its own domain, but not that of other domains. Such access can include reading or writing script global objects, invoking script functions, and reading, writing or creating DOM elements through DOM method calls. When the browser first renders a lockbox (e.g., sourced at a.com/1.thtml), the browser enters a higher privileged context—it is analogous to calling setuid("lockbox_a.com/1.thtml"). When the lockbox invokes its domain's functions outside the lockbox, the invocation is done in the context of the domain—it is analogous to calling setuid("a.com") before the invocation and then calling setuid("lockbox_a.com/1.thtml") after the invocation so that the function cannot access the lockbox. In an illustrative operation, the lockbox is unable to pass its own object references to its outside. This is to prevent the code outside the lockbox from following those references into the lockbox. For example, the lockbox is unable to pass its own display elements like <div> to its outside.

In an illustrative implementation, different privilege levels can be provided when nesting lockboxes, giving the innermost the lockbox the highest privilege and allowing an inner lockbox to access an outer lockbox. Such design can necessarily complicate the access control logic when interacting with frames and sandboxes from the same domain and from a different domain.

Illustratively, a backend server can operatively discern HTTP requests issued from a lockbox (through XMLHttpRequest or form submissions) from requests issued elsewhere so that the backend server can give higher privilege to lockbox-generated requests. In an illustrative implementation, the browser can operatively set the HTTP-referer header of HTTP requests issued from within a lockbox to be the "src" of the lockbox. This is consistent with HTTP-referer design for frames and controlling operating system for the browser (e.g., WINDOWS). Web servers can then look up the HTTP-referer header and serve sensitive content to only those HTTP requests issued from the lockbox with the right "src". Illustratively, scripts are not allowed to modify the HTTP-referer header of XMLHttpRequests and hence it is not possible to spoof HTTP-referer from the browser side. It is well-known that an attacker can spoof the HTTP-referer header in a telnet session and read lockboxed content. Nevertheless, if the lockboxed content is part of a confidential session, then the telnet session should not be able to spoof the session ID and retrieve the content.

MashupOS introduced <Sandbox> and <OpenSandbox> to contain untrustworthy content. The sandbox abstractions and lockbox can be deployed independently. When both are being deployed, we discuss their interactions in this section. The key semantics of sandboxes is that the sandboxed content is not authorized to access any domain's resources. <Sandbox> is a private sandbox that belongs to or is private a domain (though still cannot access that domain's resources), so its content can be accessed only by that domain (and hence adheres to SOP). <OpenSandbox> is a public sandbox and can be accessed by any domain though it cannot access any domain's resources.

When a sandbox nests a lockbox, like nesting a frame, the sandbox cannot access the lockbox's content since the lockboxed content runs as the principal of its domain; otherwise the key semantics of sandboxes would be violated. If the sandbox is a private sandbox from the same domain as the lockbox or is an open sandbox, the lockboxed content can access the sandboxed content; otherwise, cannot.

When a lockbox nests a sandbox, the lockboxed content can access the open-sandboxed or same-domain private-sandboxed content. The sandbox cannot access the lockboxed content.

Sensitive content to be lockboxed must only be renderable by the lockbox element and must not be renderable by the frame or script elements. Otherwise, an attacker script from outside the lockbox can launch a frame or script rendering the lockboxed content and reducing its privilege to that of a same-domain frame. This could violate the key semantics of a lockbox.

Illustratively, an exemplary MIME protocol can be deployed as a server-browser protocol for Web servers to indicate to browsers of any lockboxed content for browser enforcement. The cooperating website can label its lockboxed content by prefixing the MIME content subtype with x-sensitive+. For example, a lockboxed HTML content can be labeled text/x-sensitive+html. In an effort to safeguard against the publishing of sensitive content, the <Lockbox> tag can be constrained to render only content that is of a "sensitive" MIME type.

The presence of a lockbox at a trusted Web site should give a user stronger sense of privacy when the user enters sensitive information and a stronger sense of integrity when the user reads the lockboxed content. In an illustrative implementation, a personal image from currently practiced dynamic security skin techniques can be adapted. In an illustrative operation, users can be prompted by the website to have a shared display secret, a personal image, with the browser. The shared display secret could be a photograph, an abstract image, or even some text. The personal image can operatively serve as the background of any lockboxes of a Web page. The personal image can also be transparently overlaid onto the textboxes. This makes it more difficult for attackers to spoof a textbox inside a lockbox by floating a malicious window on top of it. To prevent attackers from overlaying a transparent window, a lockbox can be assigned a highest possible z-index value, and disallow non-lockbox elements from having this z-index.

In an illustrative implementation, the personal image can be displayed only when the top level URL (in the address bar) is the root URL of the lockbox. This is to cope with the scenario where an attacker script in a victim Web site retrieves some lockboxed content from the attacker's domain for phishing—as such the attacker's lockbox does not have the personal image background. More succinctly, the presence of the personal image indicates to a user that she sees the sensitive content area of the Web site at the URL displayed in the address bar. Personal image serves a similar purpose to the padlock indicator for SSL sessions. Nevertheless, the padlock is a public, static security indicator and is vulnerable to spoofing. In contrast, personal image is a user-specific secret between the user and the browser and cannot be easily spoofed.

Operatively, the personal image can be established when a user first uses a lockbox-capable browser: A random image is first shown to the user as the transparent background of lockbox; the user is free to choose another image of her own choice. Poor user selections such as sample pictures from well-known directories can be rejected on the basis of being easily spoofed.

A browser's protection model consists of abstractions that provide default isolation boundaries across different pieces of content in a Web application. For example, today's browsers provide Web applications the frame abstraction for isolating content from different domains, supporting SOP. Lockbox and Sandbox are additional protection abstractions that extend SOP and are SOP-compatible at the mean time.

On top of these default isolation boundaries, communications, such as socket-like CommRequest or RPC mechanisms built on top of it, can be used to provide custom, Web application-specific access control. For example, scripts from outside a lockbox can send messages to the lockbox, the lockbox can respond based on its own access control policies.

Deployment Of Lockbox:

FIG. 1 describes an exemplary computing environment 100 that can support current practices in mitigating SOP failures in a computing environment by deploying one or more lockboxes. As is shown, exemplary computing environment comprises communications network 105 operatively coupled to a plurality of client computing environments comprising client computing environment A 110, client computing environment B 125, client computing environment C 130, up to an including client computing environment N 140, and web servers 250. Additionally, as is shown in FIG. 1, the plurality of the client computing environments can operate one or more computing applications such that client computing environment A 110 can operate application 115, client computing environment B 120 can operate application 125, client computing environment C 130 can operate application 135, up to an including client computing environment N 140 operating application 145.

In an illustrative operation, the plurality of client computing applications can electronically communicate data between each other and/or web servers 150 by employing communications network 105. In the illustrative implementation, one or more of the computing applications operative on the plurality of the client computing environments can provide one or more facilities (not shown) to allow for deployment and execution of a lockbox computing application element as part of an effort to mitigate SOP failures across one or more of the plurality of client computing environments (e.g., distributed computing environment).

Figure 2:
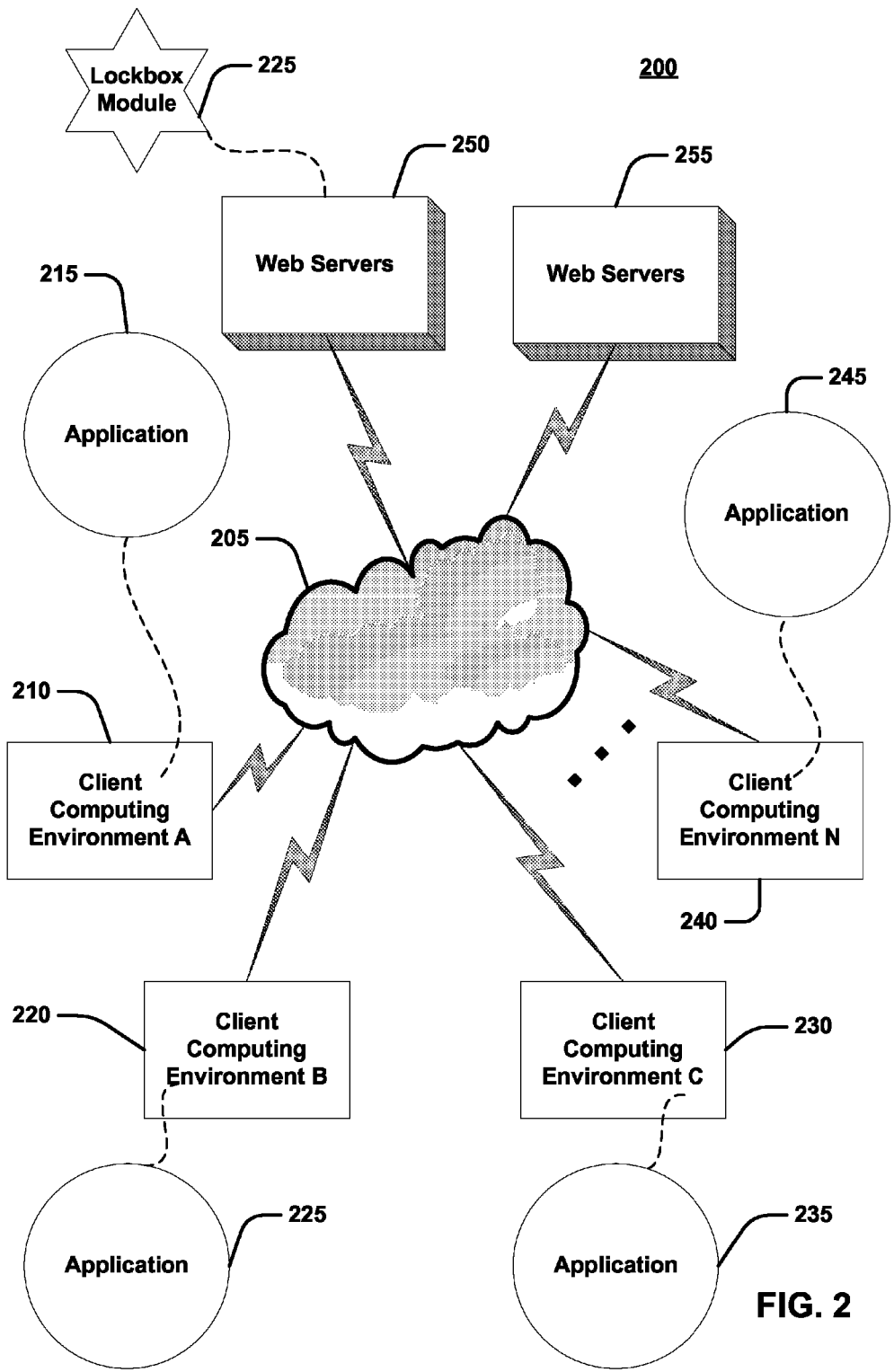
FIG. 2 is a block diagram of one example of a distributed computing environment deploying a lockbox module in accordance with the herein described systems and methods.

FIG. 2 describes exemplary computing environment 200 operative to provide SOP failure mitigation facilities using one or more lockbox computing application elements. As is shown, exemplary computing environment 200 comprises communications network 205 operatively coupled to a plurality of client computing environments comprising client computing environment A 210, client computing environment B 225, client computing environment C 230, up to an including client computing environment N 240, one or more web servers 250, and one or more web servers 255.

Additionally, as is shown in FIG. 2, the plurality of the client computing environments can operate one or more computing applications such that client computing environment A 210 can operate application 215, client computing environment B 220 can operate application 225, client computing environment C 230 can operate application 235, up to an including client computing environment N 240 operating application 245. Additionally, as is shown in FIG. 2, one or more web servers 250 can further comprise an exemplary lockbox module 225 operable to perform one or more lockbox operations on data and/or application features being communicated among and/or between computing application 215, 225, 235, 245, one or more webs servers 250, and web servers 255. It is appreciated that one or more web servers 250 is shown to operate lockbox module 225, that such description is merely illustrative as the herein described systems and methods allow for the use of a plurality of lockbox modules cooperating with a plurality of computing applications and web servers.

In an illustrative operation, the plurality of client computing applications and web servers can electronically communicate data between each other by employing communications network 205. In the illustrative implementation, one or more of the computing applications operative on the plurality of the client computing environments can cooperate with one or more web servers having one or more facilities (not shown) that invoke one or more lockbox computing application elements to lock down certain data and/or application features found on the plurality of computing applications and/or web servers according to a lockbox execution paradigm. In the illustrative operation, a participating user (e.g., programmer) can interface with one of the plurality of applications 215, 225, 235, 245, and/or one or more web servers 250 and 255 to identify data and/or application features for association with a lockbox deployed on one of the plurality of applications 215, 225, 235, 245 and/or one or more web servers 250 and 255. In the illustrative operation, a corresponding lockbox module 225, can receive requests for data and/or application features from one or more web servers 250. The lockbox module can process the received requests to determine whether to return the requested data and/or application features based on the source/origin of the request.

Figure 3:
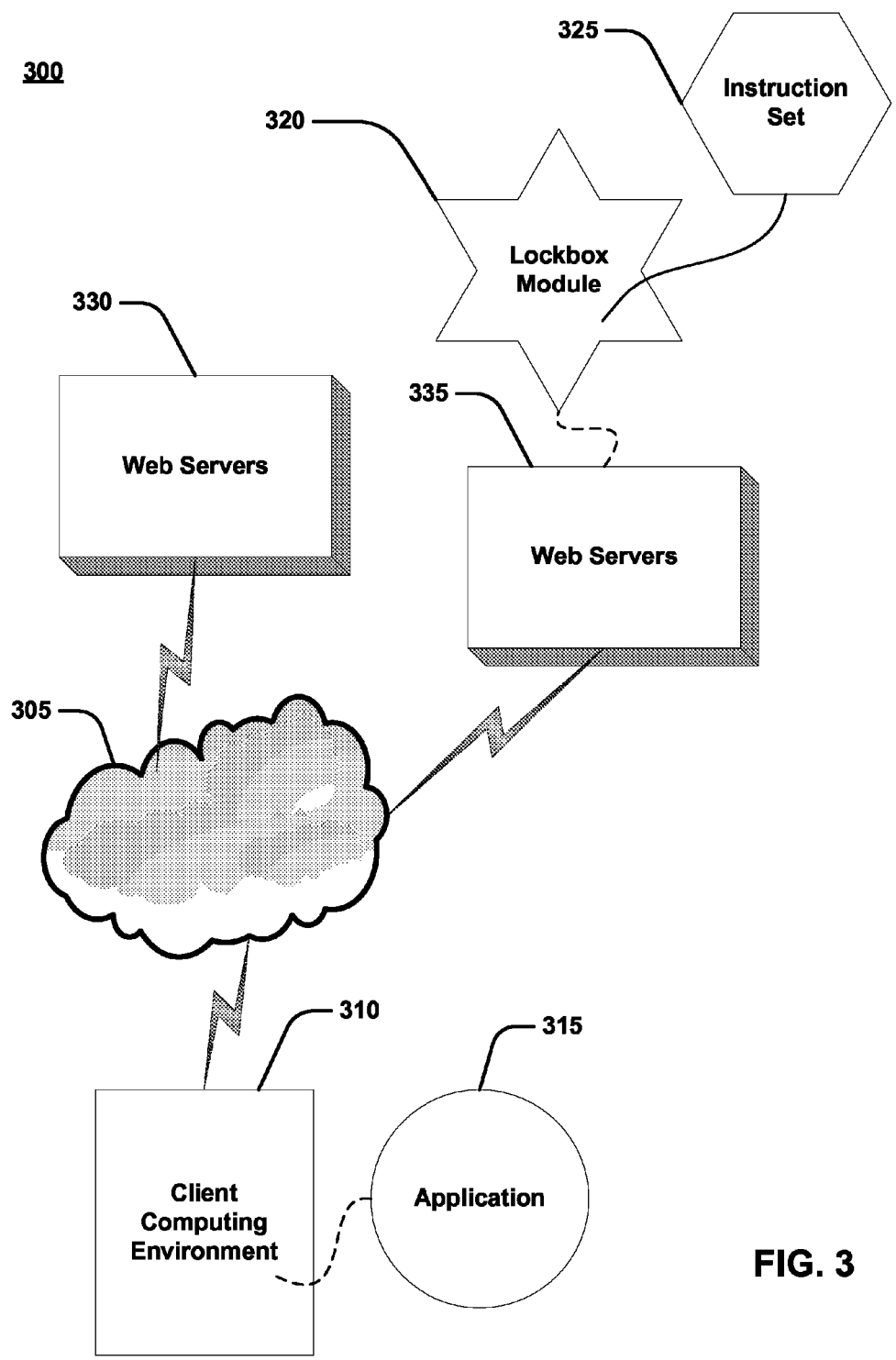
FIG. 3 is a block diagram of the interaction of exemplary components of a computing environment deploying a lockbox in accordance with the herein described systems and methods.

FIG. 3 schematically illustrates exemplary computing environment 300 deploying a SOP mitigation paradigm deploying one or more lockbox facilities. As is shown in FIG. 3, exemplary computing environment 300 comprises communications network 305 operatively coupled to client computing environment 310 (and other cooperating computing environments—not shown) which operates application 315. Further, as is shown in FIG. 3, exemplary computing environment 300 comprises one or more web servers 330 and one or more web servers 335 operable to execute lockbox module 320 cooperating with instruction set 325.

In an illustrative operation, one or more cooperating computing applications and/or web servers 330 can provide requests for data and/or application features to web servers 335 for processing. Responsive to the request for data and/or application features, web servers 335 can deploy lockbox module which can process the request and the data/features being requested according to one or more instructions provided by instruction set 325. Lockbox module 320 can process the requests to determine the source for the request. Depending on the request source, access can be granted to the data and/or application features associated with the lockbox.

Figure 4:
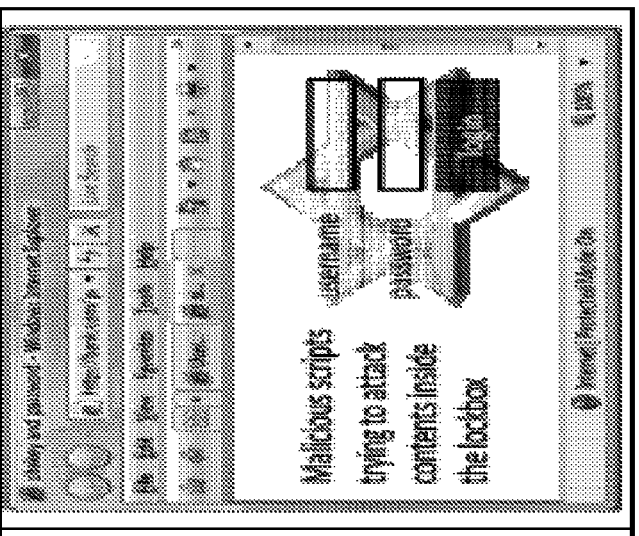
FIG. 4 is a block diagram of an exemplary screen shot of a computing application deploying a lockbox in accordance with the herein described systems and methods.

FIG. 4 shows exemplary screen shots 400 of script 405, execution file 410, and user interface 415 operable to handle a request for login data deployed in a web browser computing application. In an illustrative implementation, user login is highly confidential content. Generally, it requires user-to-server confidentiality and mutual authentication. In the face of a SOP compromise, confidential sessions can be under attackers' control. In the illustrative implementation, a lockbox is deployed such that login text boxes can be placed inside a lockbox computing element. In the illustrative implementation, by enclosing login textboxes inside a lockbox, attackers can be prevented from accessing the login data in the lockbox after a given SOP compromise. In an illustrative operation, the lockboxed, login content can be transparently overlaid on the personal image (as is shown in user interface pane 415). The personal image together with the URL in the address bar can be used to authenticate the login area from bank.com to the user. Because the z-index of lockbox is greater than that of other HTML elements, the lockbox cannot be overlaid by any other elements. The following exemplary script describes the login implementation of a user login page using the <lockbox> computing element.

```
Login.html
    <script>
        Malicious script
    </script>
    <lockbox
    src="/lockboxl.html"
        id=lbox>
    </lockbox>
/lockbox.html
<form target= "login.asp" method= "post">
    Username: <input type=text>
    Password: <input type=password>
    <input type=submit value=login>
</form>
```

Figure 5:
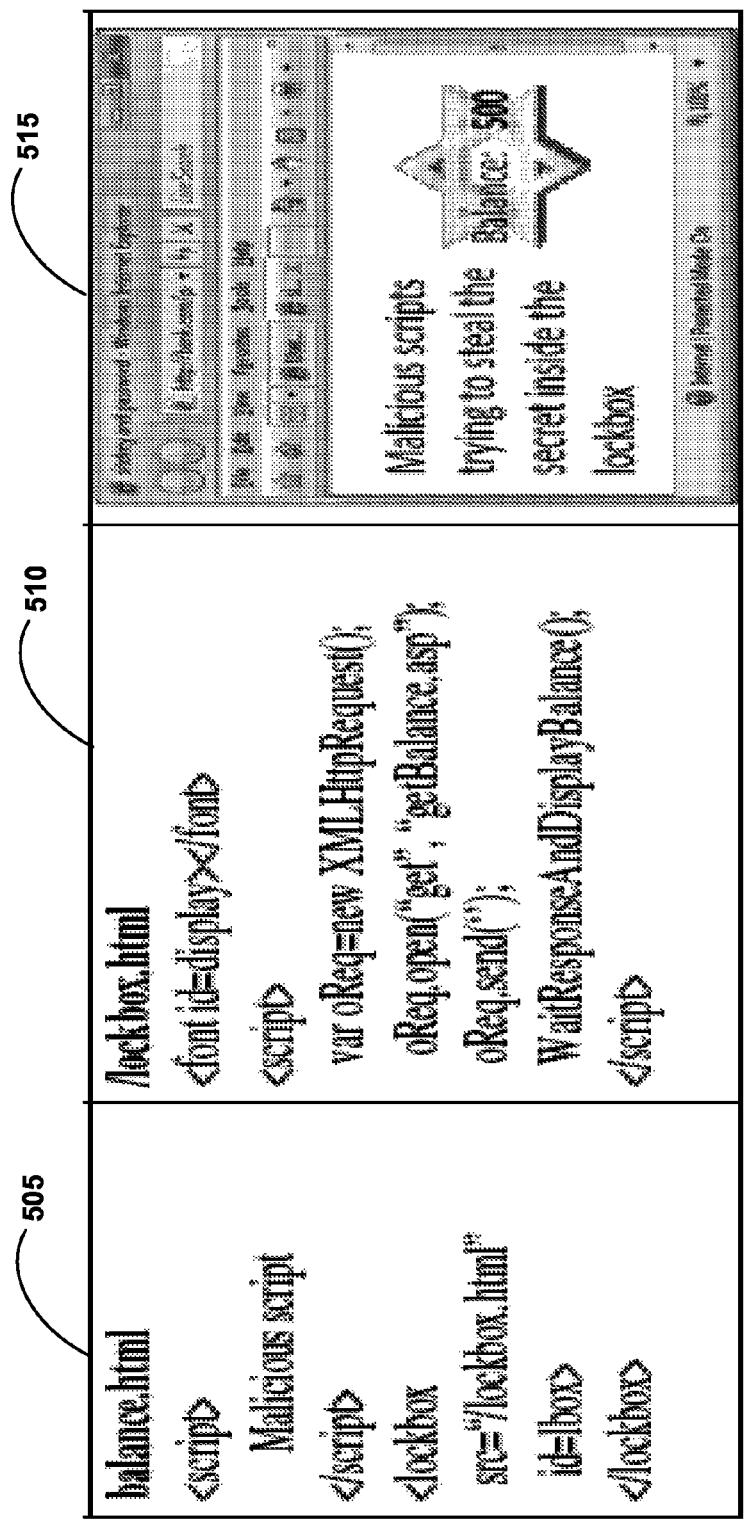
FIG. 5 is a block diagram of another exemplary screen shot of a computing application deploying a lockbox in accordance with the herein described systems and methods in accordance with the herein described systems and methods.

FIG. 5 shows an exemplary deployment of a lockbox in a website offering bank information to end-users. As is shown in FIG. 5, exemplary lockbox environment 500 can comprises various display panes 505, 510, and 515 which can be used to display and/or navigate various content relating to the deployment of a lockbox. In an illustrative implementation, display pane 505 can be used to display the lockbox script, where display pane 510 can be used to display and navigate through the lockbox execution file, and display pane 515 can be used to display user interface elements. In the illustrative implementation, an attack script that is successful in penetrating SOP can impersonate user actions, such as sending payment to some location accessible by the attacker. In the context of online payments, by putting the payment amount textbox and submit button inside a lockbox (as described by the script recited in display pane 504), attack scripts can be prevented from entering the amount and clicking on the button. Furthermore, HTTP-referer can differentiate the lockbox-issued payment request from those forged by attack scripts. In the illustrative implementation, the following exemplary script can be executed to deploy the exemplary lockbox in context to an online payment process:

```
payment.html
    <script>
        Malicious script
    </script>
    <lockbox src="/lockbox.html"
        id=lbox>
    </lockbox>
/lockbox.html
    <form target="pay.asp" method= "post">
        Amount: <input type=text>
    <input type=submit value=pay>
    </form>
```

Figure 6:
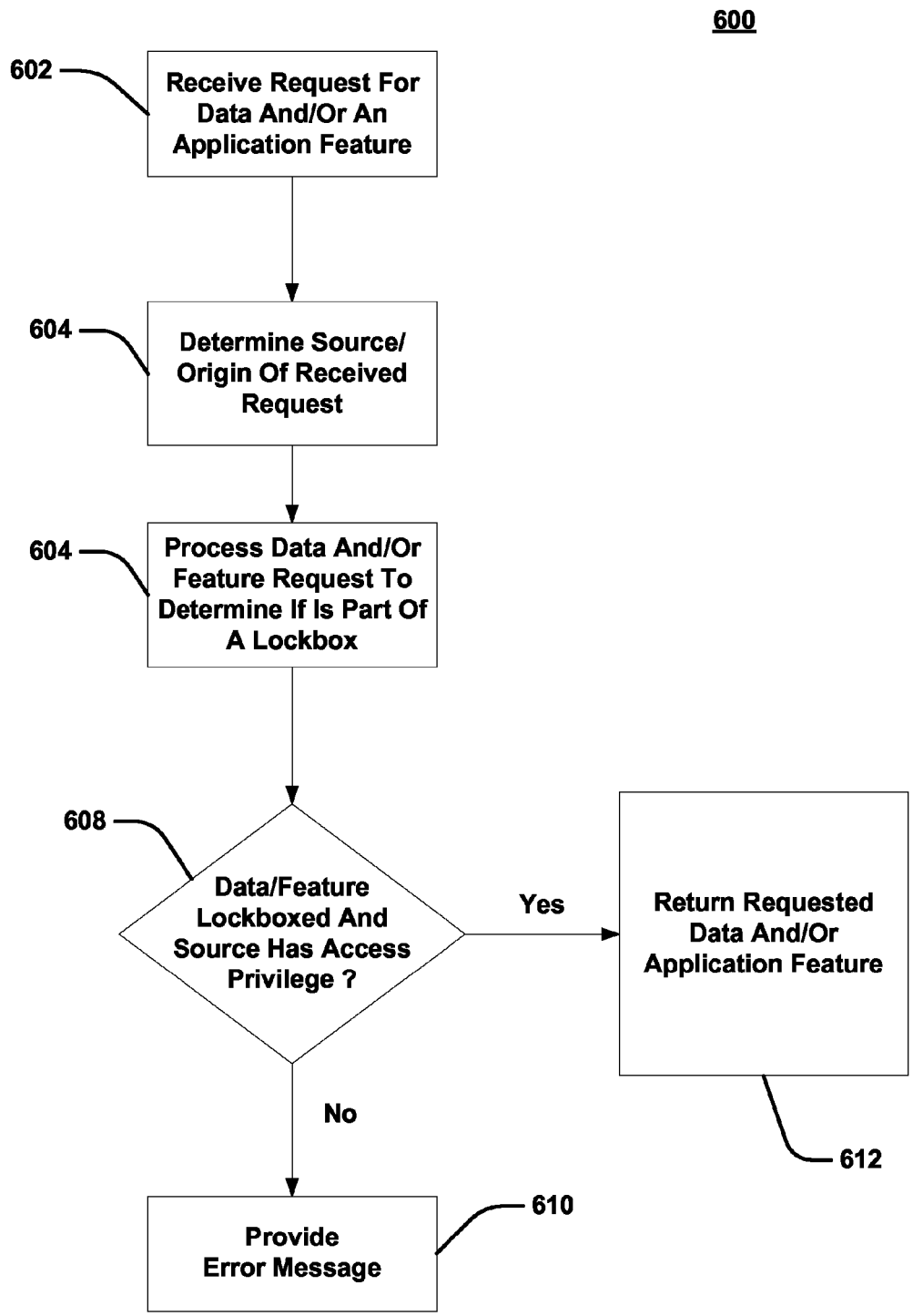
FIG. 6 is a flow diagram of an exemplary method performed mitigate same-origin-policy failures by deploying a lockbox in accordance with the herein described systems and methods.

FIG. 6 is a flow diagram of one example of a method 600 performed to mitigate SOP failures in an exemplary computing environment using a lockbox. As is shown in FIG. 6, processing begins at block 602 where a request for data and/or an application feature is received by an exemplary lockbox module operative in the exemplary computing environment. Processing then proceeds to block 604 where the source/origin of the received request is determined (i.e., to determine if the request originated on a particular DOM tree). From there processing proceeds to block 6060 where the data and/or application feature being requested is processed to determine if the requested data and/or the application feature is part of a lockbox. A check is then performed at block 608 to determine if the data/feature is lockboxed and the source has the proper access privilege (i.e., is part of the same DOM tree as the lockbox containing the requested data/feature).

If the check at block 610 indicates that the data/feature is part of a lockbox and the source requesting the data/feature is an appropriate source (e.g., from the same DOM tree as the lockbox), processing proceeds to block 612 where the requested data and/or application feature is returned to the requesting entity. However, if the check at block 608 indicates that the data/feature is not part of a lockbox or the source is not appropriate, processing proceeds to block 610 where an error message is returned.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
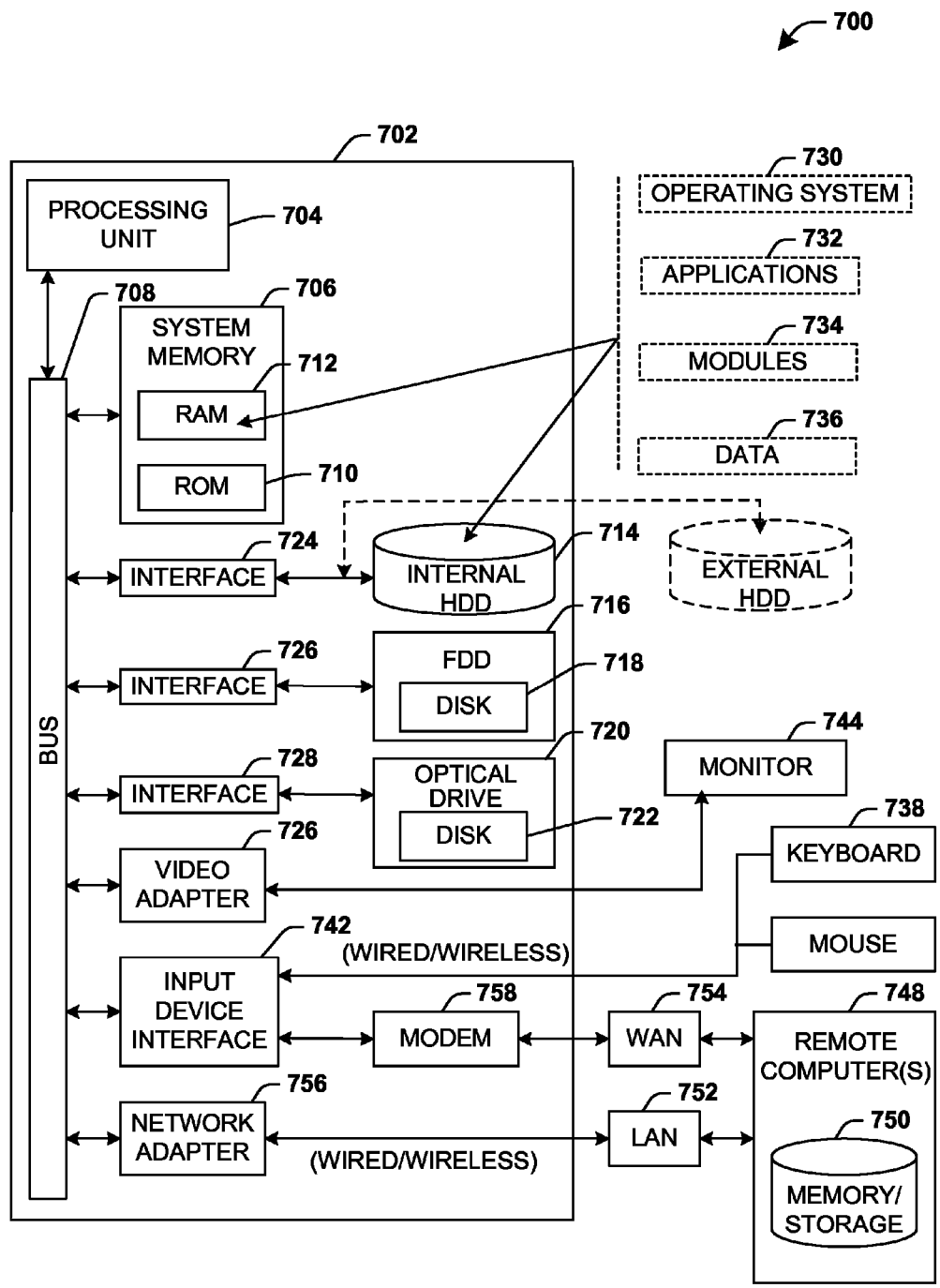
FIG. 7 is a block diagram of an exemplary computing environment.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
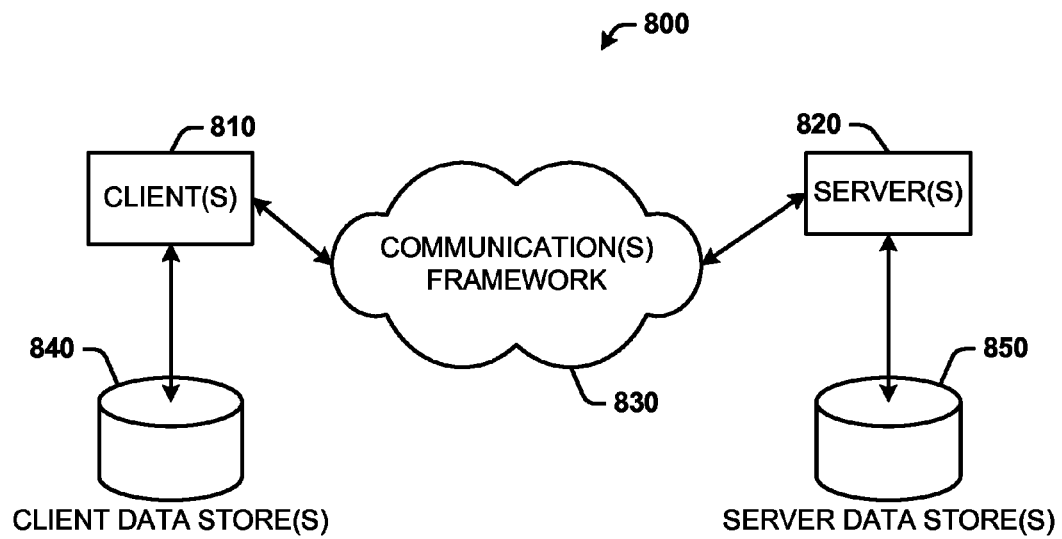
FIG. 8 is a block diagram of an exemplary networked computing environment.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system configured to facilitate mitigating security policy failures in a computing environment, the system comprising:
    a processing unit;
    a lockbox module configured to process one or more requests for at least one of data or an application feature;
    an instruction set comprising at least one instruction configured to instruct the lockbox module to:
        generate a lockbox computing application element that contains the at least one of the data or the application feature, the lockbox computing application element being configured to associate security privileges to selected content, and
        process the at least one of the data or the application feature contained in the lockbox computing application element to determine whether the at least one of the data or the application feature is associated with the lockbox computing application element according to a selected same-origin-policy (SOP) management paradigm,
    wherein the selected SOP management paradigm comprises at least one other instruction configured to associate the at least one of the data or the application feature with a plurality of nested lockboxes including at least an inner lockbox having a first associated security privilege and an outer lockbox having a second associated security privilege; and
    a computer-readable storage medium storing instructions that, when executed by the processing unit, cause the processing unit to implement the lockbox module.

2. The system as recited in claim 1, wherein the inner lockbox is accessible by the outer lockbox.

3. The system as recited in claim 2, wherein:
    the at least one of the data or the application feature is included in the inner lockbox, and
    the at least one instruction is configured to instruct the lockbox module to allow access to the at least one of the data or the application feature by a requesting entity when a source of the one or more requests is provided by a document object model (DOM) tree of the inner lockbox.

4. The system as recited in claim 3, wherein the DOM tree is a hyper text mark-up language (HTML) document object tree.

5. The system as recited in claim 3, wherein the at least one of the data or the application feature is associated with the inner lockbox as a principal of a domain that deploys the inner lockbox.

6. The system as recited in claim 1, wherein the lockbox module is configured to attach a source universal resource locator (URL) associated with the inner lockbox as a hypertext transfer protocol (HTTP) header comprising a portion of an out-going HTTP request.

7. The system as recited in claim 6, wherein the HTTP header is unique.

8. The system as recited in claim 7, wherein the lockbox module is configured to deploy a personal image based at least on asserting authenticity of individual contents contained in the inner lockbox.

9. The system as recited in claim 8, wherein the personal image is configured to be displayed via one or more cooperating computing environments and is configured to be used by the lockbox module in determining at least some of the selected content to release from the lockbox.

10. The system as recited in claim 1, wherein the at least one of the data or the application feature is contained in the lockbox computing application element according to a selected tag.

11. A method performed by executing instructions with at least one processing unit, the method comprising:
    creating a lockbox computing application element that associates security privileges with data or an application feature contained in the lockbox computing application element, the lockbox computing application element being associated with a plurality of nested lockboxes including at least:
        an inner lockbox that includes the data or the application feature and has a first associated security privilege, and
        an outer lockbox that includes the inner lockbox and has a second associated security privilege;
    receiving a request for the data or the application feature that is contained in the lockbox computing application element;
    identifying a source of the request;
    making a determination whether the source is an approved source to which the lockbox computing application element is configured to provide access; and
    selectively providing access to the data or the application feature based on the determination.

12. The method as recited in claim 11, further comprising associating the inner lockbox with a selected document object model tree.

13. The method as recited in claim 12, further comprising determining whether the source of the request is part of a domain tree that contains the inner lockbox.

14. The method as recited in claim 13, further comprising providing an error to the source when the determination is that the source is not approved.

15. The method as recited in claim 11, wherein the determination is based on whether the source of the request has the first associated security privilege.

16. The method as recited in claim 15, wherein the determination is also based on whether the source of the request has the second associated security privilege.

17. The method as recited in claim 16, wherein the selectively providing comprises providing the access when the determination indicates that the source of the request has both the first associated security privilege and the second associated security privilege.

18. The method as recited in claim 16, wherein the selectively providing comprises denying the access when the determination indicates that the source of the request does not have both the first associated security privilege and the second associated security privilege.

19. The method as recited in claim 18, wherein the lockbox computing application element is a hypertext markup language (HTML) element of an HTML document.

20. One or more hardware computer storage media storing computer executable instructions that, when executed by a computing device, cause the computing device to perform operations comprising:

creating a lockbox computing application element that associates a first security privilege and a second security privilege with data or an application feature, the lockbox computing application element identifying nested lockboxes including at least:

an inner lockbox that contains the data or the application feature and associates the first security privilege with the data or the application feature, and an outer lockbox that contains the inner lockbox and associates the second security privilege with the data or the application feature;

receiving a request for the data or the application feature that is contained in the inner lockbox identified by the lockbox computing application element;

identifying a source of the request;

determining that the source of the request is approved to access the data or the application feature in accordance with both the first security privilege and the second security privilege; and responsive to the determining, providing the data or the application feature to the source of the request.

* * * * *